US011687068B2

(12) United States Patent
Höfig et al.

(10) Patent No.: US 11,687,068 B2
(45) Date of Patent: Jun. 27, 2023

(54) METHOD AND SYSTEM FOR AUTOMATIC CONDUCTION OF A PROCESS FAILURE MODE AND EFFECT ANALYSIS FOR A FACTORY

(71) Applicant: Siemens Aktiengesellshaft, Munich (DE)

(72) Inventors: Kai Höfig, Munich (DE); Daniel Ratiu, Munich (DE); Stefan Rothbauer, Augsburg (DE)

(73) Assignee: Siemens Aktiengesellschaft, Munich (DE)

( * ) Notice: Subject to any disclaimer, the term of this patent is extended or adjusted under 35 U.S.C. 154(b) by 1051 days.

(21) Appl. No.: 16/263,788

(22) Filed: Jan. 31, 2019

(65) Prior Publication Data
US 2019/0250599 A1 Aug. 15, 2019

(30) Foreign Application Priority Data

Feb. 12, 2018 (EP) ..................... 18156324

(51) Int. Cl.
*G05B 23/02* (2006.01)
*G06F 119/02* (2020.01)
*G06Q 50/04* (2012.01)
*G05B 19/418* (2006.01)

(52) U.S. Cl.
CPC ... *G05B 23/0278* (2013.01); *G05B 19/41875* (2013.01); *G06Q 50/04* (2013.01); *G06F 2119/02* (2020.01)

(58) Field of Classification Search
CPC .......... G05B 23/0278; G05B 19/41875; G06Q 50/04; G06F 2119/02
See application file for complete search history.

(56) References Cited

U.S. PATENT DOCUMENTS

| 6,816,747 | B2 * | 11/2004 | Mammoser ............ G06Q 10/06 |
| | | | 700/109 |
| 7,027,886 | B2 | 4/2006 | Hoppes et al. |
| 7,177,773 | B2 * | 2/2007 | Lonn ..................... G06F 11/008 |
| | | | 702/182 |

(Continued)

FOREIGN PATENT DOCUMENTS

| CN | 105573274 A | 5/2016 |
| CN | 105654227 A | 6/2016 |

(Continued)

OTHER PUBLICATIONS

Machine Translation of CN 105573274 A (cited in IDS dated Oct. 27, 2021) (Year: 2016).*

(Continued)

*Primary Examiner* — Jay Hann
(74) *Attorney, Agent, or Firm* — Schmeiser, Olsen & Watts LLP

(57) ABSTRACT

Conducting automatically a process failure mode and effect analysis, PFMEA, for a factory adapted to produce a product in a production process using a meta model, MM, stored or loaded in a data storage. The stored meta model, MM, comprises abstract factory model elements modeling an abstract factory, AF, including one or more service declarations modeling abstract services across different factories, wherein each service declaration comprises failure mode declarations for different failure modes.

12 Claims, 2 Drawing Sheets

(56) References Cited

U.S. PATENT DOCUMENTS

Figure 1:
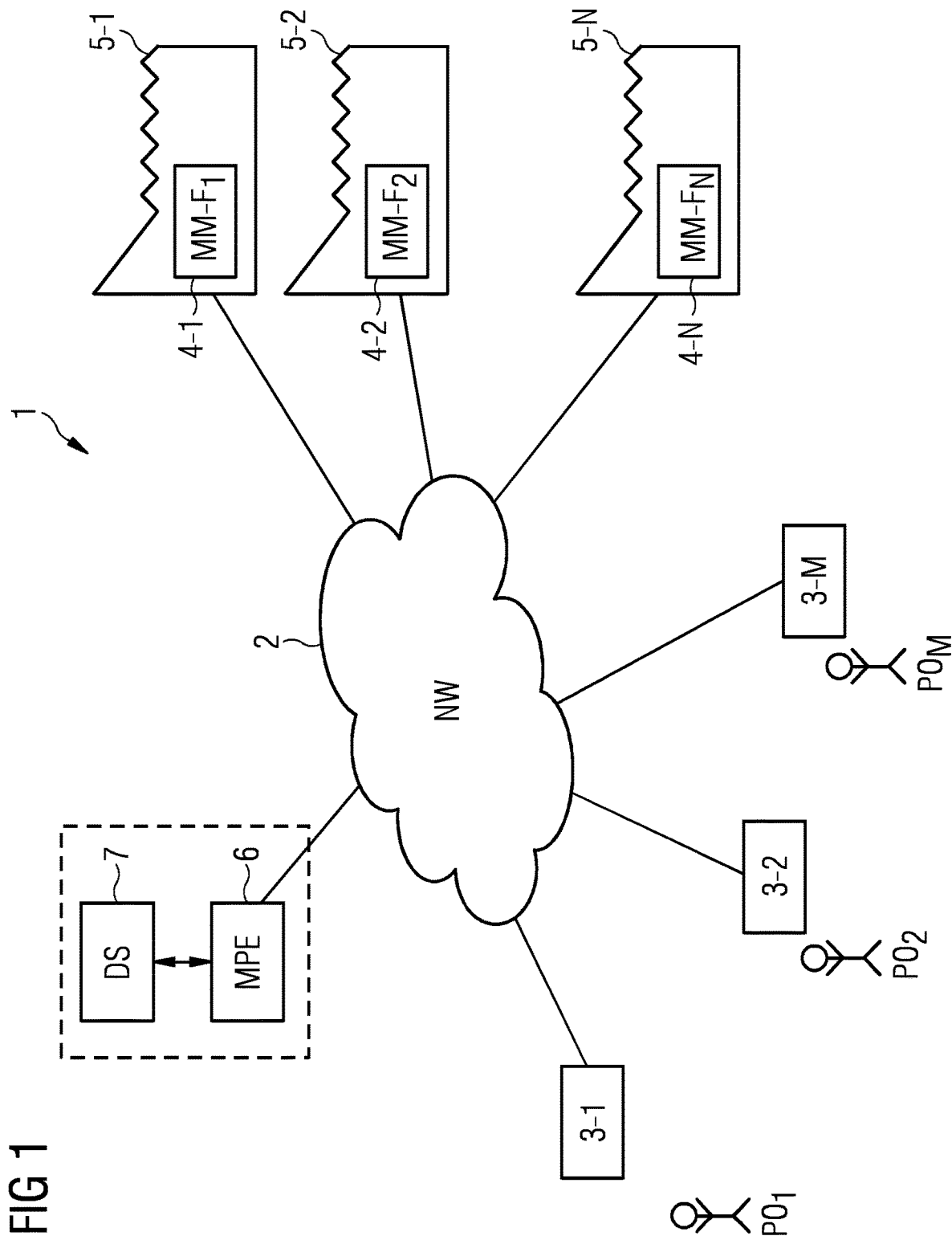

| | | | | |
|---|---|---|---|---|
| 7,263,510 | B2* | 8/2007 | Chandler | G06Q 10/10 700/109 |
| 7,516,025 | B1* | 4/2009 | Williams | G05B 23/0278 702/182 |
| 8,690,057 | B2* | 4/2014 | Schoening | G06Q 10/087 340/572.1 |
| 2009/0150325 | A1* | 6/2009 | De | G06N 7/005 715/764 |
| 2015/0039386 | A1* | 2/2015 | Kymal | G06Q 10/0635 705/7.28 |
| 2015/0378802 | A1* | 12/2015 | Höfig | G06F 11/079 714/37 |
| 2016/0154911 | A1 | 6/2016 | Altare et al. | |

FOREIGN PATENT DOCUMENTS

| | | |
|---|---|---|
| CN | 105759773 A | 7/2016 |
| CN | 105912413 A | 8/2016 |
| CN | 107357265 A | 11/2017 |
| CN | 107633155 A | 1/2018 |
| EP | 3059676 A1 | 8/2016 |
| EP | 3270249 A1 | 1/2018 |
| JP | 2010009535 A | 1/2010 |

OTHER PUBLICATIONS

Hofig, K., et al. "MetaFMEA-A Framework for Reusable FMEAs" Model-Based Safety & Assessment, LNCS 8822, 4th Int'l Symp., pp. 110-122 (2014) (Year: 2014).*

Klamma, R., et al. "Workflow Support for Failure Management in Federated Organizations" IEEE Proceedings of 31st Hawaii Int'l Conf. on System Sciences (1998) available from <https://ieeexplore.ieee.org/abstract/document/655286> (Year: 1998).*

Endris, K., et al. "Advanced Process Planning in Lean Product and Process Development" IEEE 18th Int'l Conf. on Engineering Technology & Innovation; (2012) (Year: 2012).*

Korean Notice of Allowance dated Sep. 2, 2021 for Patent Application No. 10-2019-7029606.

Moser Thomas et al: "Efficient automation 2 systems engineering process support based on semantic integration of engineering knowledge", Emerging Technologies&Factory Automation (ETFA), 2011 IEEE 16th Conference on, IEEE, pp. 1-8, XP031961410, DOI: 10.1109/ETFA.2011.6059098 ISBN: 978-1-4577-0017-0, p. 3, right-hand column, paragraph Second—paragraph Third; p. 6, right-hand column paragraph Second—p. 7, left-hand column, paragraph Second; 2011.

European Search Report dated Jul. 6, 2018 for Application No. 18156324.8.

* cited by examiner

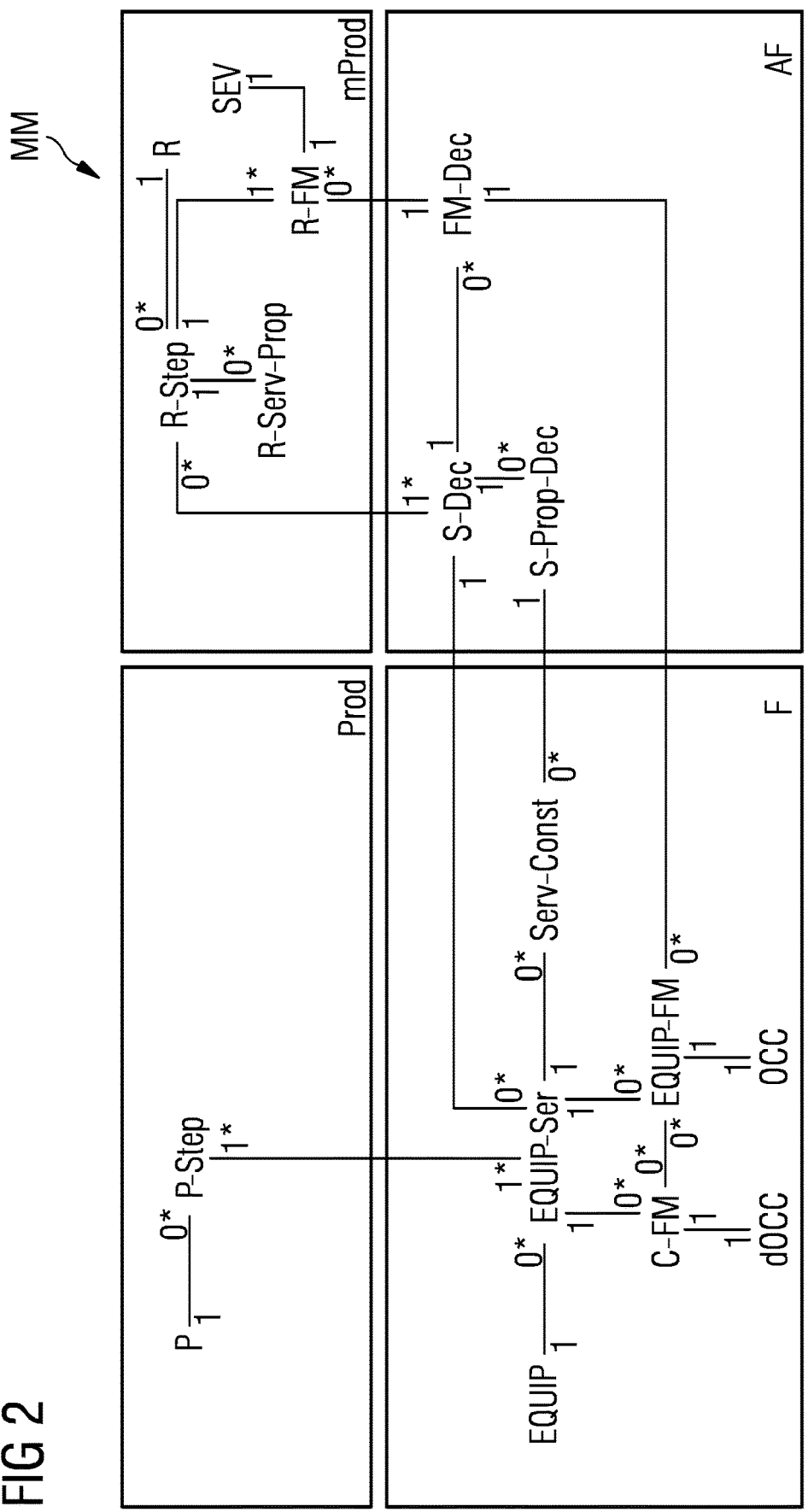

METHOD AND SYSTEM FOR AUTOMATIC CONDUCTION OF A PROCESS FAILURE MODE AND EFFECT ANALYSIS FOR A FACTORY

CROSS-REFERENCE TO RELATED APPLICATIONS

This application claims priority to European application No. EP 18156324.8, having a filing date of Feb. 12, 2018, the entire contents of which are hereby incorporated by reference.

FIELD OF TECHNOLOGY

The following relates to a method and system for automatic conduction of a process failure mode and effect analysis PFMEA for a factory producing a product in a production process.

BACKGROUND

In a i4.0 production scenario, the main focus is on a rapid adjustment of a production factory to adopt changes, in particular changing requirements. Industrial products are produced in a physical factory in a production process comprising different process steps. Each physical factory comprises a plurality of components or equipment which provide equipment services used in a process step of the industrial manufacturing process. The output of a production process can be increased by adding additional production capacities or changes in the products being produced. In an extreme production scenario, products can be produced only one time (lot-size-1) or only on demand.

Due to the dynamics in a factory such as constant changes in existing machinery or factory equipment, the production scenario for producing an industrial product is no longer static but undergoes constant changes. As a consequence, every industrial product manufactured in a factory can possibly take its own way through the factory. In a constantly changing production scenario, it can no longer be expected that the same product is produced in the same way. Each product will be routed during the manufacturing process according to a current production situation in the production factory.

To evaluate the quality of a manufactured product regarding the respective production process, a process failure mode and effect analysis PFMEA is typically performed. In a PFMEA, every process step can negatively influence the quality of the product depending how good the respective process step has been executed. The process failure mode and effect analysis PFMEA captures possible negative outcomes of a process step execution and can also define measures to detect unwanted impacts on the product quality. For high quality demands, such an analysis is important to document the applied quality measures and to investigate where drawbacks in the production process are located and how they can be addressed.

Since in an i4.0 production scenario, each product can comprise a separate way of being produced, an automation is required when a process failure mode and effect analysis PFMEA is requested.

SUMMARY

An aspect relates to a method and a system for conducting automatically a process failure mode and effect analysis PFMEA in an i4.0 production environment.

Embodiments of the invention provides according to a first aspect a method for conducting automatically a process failure mode and effect analysis PFMEA for a factory adapted to produce a product in a production process using a meta model stored or loaded in a data storage, wherein the meta model comprises abstract factory model elements modeling an abstract factory including one or more service declarations modeling abstract services across different factories, wherein each service declaration comprises failure mode declarations for different failure modes.

The method according to embodiments of the present invention differentiates product requirements, production steps and quality measures such that complex quality requirements can be addressed in any instance of a factory that uses a common meta modeling language. The meta model stored in the data storage provides all information required to automatically conduct a process FMEA.

In a possible embodiment of the method according to the first aspect of embodiments of the present invention, the stored meta model comprises product model elements modeling the product by at least one recipe step addressing an associated service declaration for each failure mode declaration using a recipe failure mode and a severity value.

In a further possible embodiment of the method according to the first aspect of embodiments of the present invention, the severity value is a quality attribute modeling an impact on an erroneous process output on an average quality of the product produced by the factory.

In a still further possible embodiment of the method according to the first aspect of embodiments of the present invention, the stored meta model comprises factory related model elements modeling an equipment of a specific factory by addressing service declarations within equipment services.

In a still further possible embodiment of the method according to the first aspect of embodiments of the present invention, each equipment service comprises combinations of failure mode declarations of its associated service declaration and occurrence values.

In a still further possible embodiment of the method according to the first aspect of embodiments of the present invention, each equipment service comprises covered failure modes addressing equipment failure modes of equipment of the specific factory, wherein each covered failure mode includes a decreased occurrence value.

In a still further possible embodiment of the method according to the first aspect of embodiments of the present invention, the occurrence value forms a quality attribute of an equipment modeling a probability of an equipment failure mode.

In a further possible embodiment of the method according to the first aspect of embodiments of the present invention, the stored meta model comprises production model elements modeling process steps to be executed by the specific factory to produce the respective product in the production process fulfilling the recipe steps.

In a further possible embodiment of the method according to the first aspect of embodiments of the present invention, the abstract services provide a global library of all available production services across a plurality of different physical factories.

In a still further possible embodiment of the method according to the first aspect of embodiments of the present invention, each service declaration comprises a service property declaration associated with a service constraint of an equipment service.

In a further possible embodiment of the method according to the first aspect of embodiments of the present invention, the service property declaration comprises parameters to be set for a recipe step.

In a still further possible embodiment of the method according to the first aspect of embodiments of the present invention, available production processes usable to produce the respective product described in a recipe received from a terminal of a product owner are generated automatically on the basis of the meta model stored in the data storage.

The embodiments further provides according to a second aspect a system configured to conduct automatically a process failure mode and effect analysis PFMEA for a factory according to claim 13.

The embodiments provides according to the second aspect a system configured to conduct automatically a process failure mode and effect analysis PFMEA for a factory producing a product in a production process using a meta model stored in a central data storage of said system, wherein said meta model comprises abstract factory model elements modeling an abstract factory including one or more service declarations modeling abstract services across different factories, wherein each service declaration comprises failure mode declarations for different failure modes.

In a possible embodiment of the system according to the second aspect of embodiments of the present invention, the system comprises a central model processing entity adapted to process a received recipe for a production of a product from a terminal of a product owner connected to the central model processing entity to provide production processes usable to produce the respective product as described in the received recipe with a sufficient product quality fulfilling a severity requirement of the product owner indicated by a severity value.

In a possible embodiment of the system according to the second aspect of embodiments of the present invention, the central model processing entity is connected to a network cloud infrastructure and is adapted to load and process meta models from databases of different factory owners into the central data storage in response to a recipe received from a terminal of a product owner.

BRIEF DESCRIPTION

Some of the embodiments will be described in detail, with references to the following Figures, wherein like designations denote like members, wherein:

FIG. 1 shows a schematic diagram for illustrating a system for automatic conduction of a process failure mode and effect analysis for a factory according to an aspect of embodiments of the present invention; and FIG. 2 illustrates a schematic diagram of a meta model which can be used by the method and system according to embodiments of the present invention.

DETAILED DESCRIPTION

As can be seen in the schematic diagram of FIG. 1, the illustrated system 1 comprises a common network cloud infrastructure 2 to which terminals 3-1, 3-2 . . . 3-$m$ of different product owners $PO_1, PO_2, \ldots, PO_M$ are connected. The network cloud infrastructure 2 can be further connected in the illustrated exemplary embodiment to databases 4-1, 4-2, 4-$n$ of several different physical factories 5-1, 5-2, . . . , 5-$n$ belonging to different factory owners. The system 1 as illustrated in FIG. 1 further comprises a central model processing entity 6 having access to a central data storage 7.

The central model processing entity 6 can be run by a service provider providing services to the product owners and the owners $PO_1, PO_2, \ldots, PO_M$ of the different physical factories 5-1, 5-2, . . . , 5-$n$.

The network 2 can comprise a complex network cloud infrastructure including the internet or a network provided for the services of the service provider. For each database 4-$i$ of the different physical factories 5-1, 5-2, . . . , 5-$n$, an associated meta model MM for the respective factory can be stored and loaded to the central data storage 7. Alternatively, a plurality of different meta models MM associated with different physical factories 5-1, 5-2, . . . , 5-$n$ of different factory owners can already be stored in the central data storage 7 of the system 1. The system 1 is provided for conducting automatically a process failure mode and effect analysis PFMEA for one or more of the physical factories 5-1, 5-2, . . . , 5-$n$ adapted to produce a product in a production process using the meta model MM stored in the data storage 7.

The meta model MM stored in the data storage 7 comprises abstract factory model elements modeling an abstract factory AF including one or more service declarations modeling abstract services across different factories. An embodiment of the meta model MM stored in the central data storage 7 is illustrated in FIG. 2. The meta model MM consists of different model elements. The meta model MM comprises abstract factory model elements modeling an abstract factory AF including one or more service declarations modeling abstract services across different factories. Each service declaration S-DEC comprises a failure mode declarations FM-DEC for different failure modes FM.

The abstract factory model elements of an abstract factory collect common specifications of services and service parameters across all factories. These model elements enable to specify a product independently from a specific factory 5-$i$.

In a possible embodiment, the stored meta model MM as illustrated in FIG. 2 comprises also product model elements modeling the product mProd to be manufactured by at least one recipe step R-Step addressing an associated service declaration S-Dec for each failure mode declaration FM-DEC using a recipe failure mode R-FM and a severity value SEV. The product model elements address the order and steps related to what has to be done to produce or manufacture the respective product mProd. The severity value SEV forms a quality attribute modeling an impact of an erroneous process output on an average quality of the product manufactured by the factory.

In a possible embodiment of the system 1 according to the first aspect of embodiments of the present invention, the stored meta model MM further comprises factory related model elements modeling an equipment of a specific concrete factory F by addressing service declarations within equipment services. The factory related model elements model a specific factory, in particular its machinery. The factory model elements model what the machinery of the specific factory 5-1, 5-2, . . . , 5-$n$ is capable to perform and what quality measures are in place or can be used. Each equipment service EQUIP-SER can comprise combinations of failure mode declarations of its associated service declaration and occurrence values OCC. As illustrated in FIG. 2, each equipment service comprises covered failure modes C-FM addressing equipment failure modes EQUIP-FM of equipment of the specific factory 5-1, 5-2, . . . , 5-$n$, wherein each covered failure mode C-FM can include a decreased occurrence value dOCC. The occurrence value OCC is a quality attribute of an equipment modeling a probability of an equipment failure mode EQUIP-FM.

In a further possible embodiment of the system 1 according to the first aspect of embodiments of the present invention, the stored meta metal MM stored in the central data storage 7 of the system 1 can comprise production model elements modeling process steps to be executed by the specific factory 5-1, 5-2, . . . , 5-n to produce the respective product in the production process fulfilling recipe steps. The production model elements address the concrete production Prod of the product mProd to be manufactured. Here, the process steps P-Steps indicate concrete ordered actions that are to be executed to produce the product mProd. These production steps P-Steps answer how a product is to be produced.

Accordingly, the meta model MM stored in the central data storage 7 of the system 1 can comprise in a possible embodiment abstract factory model elements, product model elements, factory related model elements as well as production model elements as also illustrated in FIG. 2.

The abstract services provide a global library of all available production services across a plurality of different physical factories such as factories 5-i illustrated in FIG. 1. In a possible embodiment, each service declaration S-DEC of the meta model MM can comprise a service property declaration S-Prop-Dec associated with a service constraint Serv-Const of an equipment service EQUIP-SER as also illustrated in FIG. 2. The service property declaration S-Prop-Dec can comprise parameters to be set for a recipe step R-Step. In a possible embodiment, available production processes usable to produce the respective product described in a recipe R received by the model processing entity 6 from a terminal 3-i of a product owner PO can be generated on the basis of the meta model MM stored in the data storage 7 of the system 1.

The central model processing entity 6 of the service provider is configured to process a recipe R received via the network 2 for a production of a desired product mProd from a terminal 3-i of a product owner $PO_1$, $PO_2$, . . . , $PO_M$ connected to the central modeling processing entity 6 via the network 2. The central modeling processing entity 6 can provide production processes P usable to produce the respective product mProd as described in the received recipe R with a sufficient product quality fulfilling in particular a severity requirement of the product owner PO indicated by an assigned severity value SEV. The central model processing entity 6 can be connected to a network cloud infrastructure 2.

The central model processing entity 6 is adapted to load and process meta models MM from databases 4-I of different factory owners into its central data storage 7 in response to a recipe received from a terminal 3-i of a product owner. Accordingly, a product owner PO having a goal to produce a specific product mProd can send a recipe R in an inquiry message for producing this product mProd to the model processing entity 6 via the network 2. The different meta models MM-F of the different factories 5-i of the different factory owners can be processed to find production processes which provide producibility of the respective product, i.e. which are able to produce the respective product specified by the product owner PO in its recipe R with a sufficient product quality fulfilling a severity requirement demanded by the product owner PO and indicated for instance by a corresponding severity value SEV. The severity value SEV is a quality attribute which models an impact of an erroneous process output on the average quality of the produced product. Accordingly, the model processing entity 6 can determine which factories 5-i are able to produce the specified product with a sufficient quality using the meta models MM stored in or loaded into the central data storage 7.

Further, in the example illustrated in FIG. 1, the model processing entity 6 may find that the physical factory 5-2 is able to produce the desired product with sufficient quality. In this case, the model processing entity 6 can send an electronic message via the network 2 to the product owner $PO_1$ having sent the respective recipe message to the model processing entity 6. For instance, if the product owner $PO_1$ sends a recipe message from his terminal 3-1 via the network 2 to the model processing entity 6 specifying a recipe R to produce a product mProd along with a quality level indicated by a corresponding severity value SEV, the central model processing entity 6 can evaluate the available meta models MM of different factories 5-i to find a matching factory 5-i able to produce the required product specified in the recipe R with a sufficient product quality. For example, if the meta model MM of the second factory 5-2 is evaluated and it is found that the manufacturing factory 5-2 produces the demanded product with sufficient quality, the model processing entity 6 can send a message to the terminal 3-1 of the inquiring product owner $PO_1$ that the factory 5-2 could fulfil his requirements and may send also an address or link to the inquiring product owner $PO_1$ allowing the product owner PO to contact the factory owner of the matching physical factory 5-2. The product owner such as $PO_1$ can then contact either directly the factory owner of the fitting factory 5-2 or ask the service provider to contact the factory owner via the network 2.

The complex meta model MM stored in the central data storage 7 allows to map different activities, use cases and roles in a domain of dynamic reconfigurable production scenarios to automatically generate a process FMEA. The product owner PO can specify what (recipe) steps in which order need to be executed to produce a specific product (recipe R). The product owner PO can address abstract services (service declarations) to specify a step of its recipe R. These abstract services provide a global library of all services. Each service declaration can have some constraints and parameters (service property declaration) that can be set for a recipe step (recipe service property). For example, the abstract service "drill" requires a rotation speed of the drill and the size of the drill hole as a parameter. When instantiated in a recipe step, these parameters need to be set. For service declaration, different failure modes FM can be stored (failure mode declarations). Independently from service implementations (equipment service) by the concrete specific equipment or machinery (equipment), failure modes are known in general. For example, the service "drill" has the potential failure mode "skew drill hole" for all concrete machinery implementing this service.

For each addressed service declaration S-Dec in a recipe step, the failure mode declarations FM-Dec can be known to the product owner PO. The product owner PO can specify in a possible embodiment how severe the different failure modes are (using recipe failure modes R-FM). Thus, a first step of a risk assessment according to a process FMEA can be performed in a possible embodiment without knowledge about the concrete equipment that later produces the product. The combination of process steps and failure modes FM can be rated with the severity value SEV.

Independently from this specification scenario of a product, the owner of a factory can model the services of an equipment (equipment services) addressing abstract service declarations from the common set of specified services (service declarations). Service constraints can be used to specify the possible operating parameters and limitations of service property declarations.

It is possible to specify which machinery is available and which services can be provided for which parameter limitations. Furthermore, the factory owner can get a list of possible abstract failure modes (failure mode declarations) and may specify how often the abstract failure mode occurs for the concrete specific service (equipment failure mode). The factory owner knows his machinery or has collected data about it and can also provide information about occurrence values OCC of concrete failure modes.

Since the equipment of the factory 5-$i$ is not only able to execute production steps in a recipe but also to perform quality measurements, an equipment service can also cover certain failure modes. These can be the same service, a different service of the same equipment or of a service from a different equipment. For example, a robot arm that can pick and place an object can also supervise its actions using for instance a camera. In this case, the failure mode "misplacement" of the service "pick and place" can be covered by the service "camera supervision" from the same equipment. Using this methodology, the factory owner can specify which machinery can be used to increase the quality of the production. Since quality measures do decrease the occurrence of certain failure modes, each covered failure mode stores a decreased occurrence value dOCC.

Using the severity SEV of a failure mode from the product specification (recipe failure mode) multiplied by the occurrence value OCC of the equipment failure mode EQUIP-FM or with the decreased occurrence value dOCC of a quality measure, a process FMEA can be conducted automatically by the model processing entity 6 for a product produced by a certain process on a concrete set of equipment.

The method and system 1 according to embodiments of the present invention are described in the following by a simple example. For instance, the product model elements of the meta model MM may contain two recipes step, i.e. a first recipe step "drill a hole" and a second recipe step "put it on the stack" that belong to a recipe R (not depicted). Each step references a service declaration. Drilling has the possible failure mode FM of "skew drill hole" and the service "pick and place" has the failure mode "misplacement".

The product owner PO can rate the failure mode "skew drill hole" for its recipe step "drill a hole" with a relatively high severity with a severity value SEV of e.g. 8 and the failure mode "misplacement" for the other step with a relatively low severity value of SEV=3. In a possible embodiment, the severity values SEV may be in a predefined range of values such as from severity=0 (lowest quality demand) to severity=10 (highest quality demands).

In a factory 5-$i$, there may be two machines in the given example, i.e. a "drill press" machine implementing the service "drill" and a second machinery "robot arm" implementing the service "pick and place". In the example, the second machinery "robot arm" may additionally have a camera that can also be used to detect the failure mode "skew drill hole".

The factory owner of the factory 5-$i$ can provide information that the drill press has a higher occurrence of 5 (OCC=5) that it does produce skew drill holes. The camera of the robot arm can detect this failure mode and may reduce its occurrence value OCC to an occurrence value OCC=2.

The production process is modeled by production model elements of the meta model MM. The production model elements model process steps to be executed by the specific factory 5-$i$ to produce a respective product in the production process fulfilling the recipe steps. The process step "drill press" executes the recipe step "drill a hole" via the abstract service "drill". The robot arm executes the recipe step "put it on the stack" via the service "pick and place". The risk of the failure mode "skew drill hole" for the first process step is the product of the occurrence value (OCC=5) multiplied with the severity (SEV=8) providing a value of 5*8=40.

Further, the risk for misplacement of the second process step is the product of the occurrence value (OCC=2) and the severity value (SEV=3) providing a value of 2*3=6. The product of the occurrence value OCC and the severity SEV is an indicator for the risk. Since a value of 40 is an unacceptable risk in the given example, the factory 5-$i$ can execute the additional quality measure of the robot arm using its camera. This reduces the risk of a skew drill hole in the final manufactured product to a decreased occurrence value dOCC=2 multiplied with the severity value SEV=8 giving a value of 16 which forms a considerable risk reduction of 40−16=24. The stored meta model MM can be used to decide whether a recipe R can be used during a production process.

The service provider may provide different kinds of services to the product owners PO and/or factory owners. In a possible embodiment, the model processing entity 6 of the service provider is able to calculate a producibility of the product indicating whether the product can be produced by the respective factory 5-$i$.

```
canBeProduced=true ;
Delete all quality steps from P ;
i=0
FOREACH p in P DO
    rsd=R[i]. ServiceDeclaration ;
    psd=p. EquipmentService. ServiceDeclaration ;
    IF ( rsd == esd ) DO
      FOREACH pc in psd. ServiceConstraint DO
        pp = pc. ServicePropertyDeclaration
        IF ! (pc matches pp) DO
          canBeProduced=false ;
        END;
      END;
    ELSE
      canBeProduced=false ;
    END;
    i++;
END;
RETURN canBeProduced;
```

In a further possible embodiment, the model processing entity 6 of the service provider can further calculate whether a sufficient quality of a process is achieved.

This can be achieved in a possible embodiment by a routine as illustrated in the following pseudo code.

```
hasEnoughQuality=producibility (P,R) ;
i=0
FOREACH r in R DO
    FOREACH rfm in r. RecipeFailureMode
      sev=rfm.occ ;
      efm = related EquipmentFailureMode ;
      occ=efm.occ ;
      IF EXISTS (CoveredFailureMode c)
        occ=c . occ ;
      END ;
      rpn=occ*sev ;
      IF (rpn>t)
        hasEnoughQuality=false ;
      END ;
    i++;
END ;
```

-continued

```
RETURN hasEnoughQuality ;
```

In a still further possible embodiment, the model processing entity 6 of the service provider is also configured to provide process optimization. Using the meta model MM stored in the data storage 7, for each recipe R, all possible processes can be generated automatically for a certain specific factory 5-$i$. First, all possible processes that can produce a product according to the recipe R are generated or calculated by the model processing entity 6. It is possible that in a factory 5-$i$, there are multiple machines that can provide services required in a certain order to execute the recipe steps r.

```
FOREACH r in R DO
  Options[r]=all EquipmentServices for r ;
END;
FOREACH path over Options DO
  IF (producibility (path ,R)
    P[i]=path ;
  END;
END;
```

After having achieved possible production orders in P, it is possible to add the quality steps and to evaluate them.

```
FOREACH p in P DO
  FOREACH ProcessStep ps in p DO
    FORALL SUBSETS of coveredFailureModes
      add after ps in p the related
      EquipmentServices for this subset ;
      insert it as a new process in P'
  END;
  END;
END;
```

It is possible to extend the set of all processes P to the set of all processes with quality steps P'. The quality threshold for all processes in P' can be evaluated and processes that do not fulfill the quality can be removed. It is then possible to evaluate for the process with the highest quality or other optimization criteria, in particular production costs.

The meta model MM stored in data storage 7 stores the structure information in a way that a process FMEA can automatically be conducted for a product. With this automatic method, a routing process or the producibility can be decided in an i4.0 production scenario.

The method and system according to embodiments of the present invention can be applied for any kind of complex product manufactured in a production factory according to the wishes of a product owner PO as specified in a product recipe R. For instance, a product owner PO who desires to have a product manufactured in a remote factory 5-$i$ may send an inquiry with recipes R in a structured meta model MM language to the service provider to find a fitting factory 5-$i$.

The method and system 1 according to embodiments of the present invention is especially valuable if the number of products to be produced is relatively small, i.e. in extreme cases a manufacturing lot size of 1. For instance, a product owner PO located in Europe can find with the system 1 according to embodiments of the present invention a matching production factory 5-$i$ located in a remote area (for instance Asia) able to produce the product with a sufficient quality.

Accordingly, the method and system 1 according to embodiments of the present invention facilitates the matching of product owners PO and factory owners.

The PFMEA can be performed for each produced product individually. For high quality demands such an analysis is relevant to document the applied quality measures and to find out where drawbacks in the production process are and how they can be overcome or addressed. The method and apparatus 1 provides an automated model-based process failure mode and effect analysis PFMEA, in particular for log-size-1 production systems. The core of the meta model MM stored in the data storage 7 of the system 1 according to embodiments of the present invention is formed by abstract factory model elements including one or more service declarations modeling one or more abstract services (such as drilling) for a production scenario for different factories 5-$i$ wherein each service declaration comprises one or more failure mode declarations (such as drilling too deep) describing possible erroneous production outputs of the respective service declaration.

In a possible embodiment, if the components of a factory or production facility are changed or updated, the meta model MM of the associated factory is also updated and may be loaded up to the central data storage 7 of the system 1. The equipment of the factory 5-$i$ can comprise software and/or hardware components. By replacing hardware components and/or updating software components, the factory related model elements of the meta model MM can also be updated within the central data storage of the system. The abstract factory model elements of the meta model MM relate to an abstract standard factory used for FMEA analysis and is not influenced by any changes in real physical factories.

If several different factories fulfill the production requirements and quality standards demanded by the product owner PO, the product owner PO can select one of the factories for production and contact the corresponding factory owner. If no factory can be identified by the system 1 meeting for instance the quality demands of the product owner PO defined by the severity value SEV, the system 1 may invite the product owner PO to change the severity value SEV (i.e. reduce the severity value) such that a matching factory can be found.

The factory owner participating in the system 1 according to embodiments of the present invention has the advantage that the defined meta model MM of the factory 5-$i$ allows to automatically detect whether the factory 5-$i$ is capable of producing a product specified in a recipe R of a product owner PO with the required product quality. This can be performed automatically by the system 1 according to embodiments of the present invention using the meta model MM of the factory 5-$i$. Accordingly, the factory owner F-$i$ of the factory 5-$i$ must not manually evaluate an inquiry of a product owner PO to investigate whether the factory 5-$i$ is capable of producing the product and whether the factory 5-$i$ is also capable of producing the product with the required product quality specified by the product owner PO. An advantage for the product owners PO is that they can find automatically and very fast manufacturing factories 5-$i$ or production facilities which could be used for producing their respective products with sufficient quality. This makes it possible for product owners PO and factory owners F-$i$ to cooperate globally increasing the production efficiency significantly. Consequently, a wide variety of different complex products can be produced with a higher production efficiency and saving resources.

A further advantage of the system 1 according to embodiments of the present invention resides in that the probability is increased that specified products are manufactured by a fitting factory 5-*i* with sufficient product quality. Because of the automatic matching between the product owner PO and the factory owner F-*i* and its factory 5-*i*, the efficiency of the production handling is increased to such an extent that even small manufacturing lot sizes can be accepted by the factory owners. Even a manufacturing lot size of only one product to be produced by a manufacturing facility or factory 5-*i* is possible because of the automated model-based process failure mode and effect analysis PFMEA provided by the system 1 according to embodiments of the present invention.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The claim are as follows:

1. A method comprising:
   automatically conducting, by a central model processing entity connected to a network cloud infrastructure adapted to load, process and use a meta model stored or loaded in a data storage, a process failure mode and effect analysis for a factory adapted to produce in a production process,
   wherein the meta model comprises abstract factory model elements modeling an abstract factory including one or more service declarations each having constraints and parameters that are independent from any equipment and set for at least one recipe step for a recipe such that when the recipe is initiated the parameters need to be set, the one or more service declarations modeling abstract services across different factories, wherein each service declaration comprises failure mode declarations for different failure modes,
   wherein the stored meta model comprises factory related model elements by addressing service declarations within equipment services, and
   wherein each equipment service comprises combinations of failure mode declarations of its associated service declaration and occurrence values.

2. The method according to claim 1 wherein the stored meta model comprises product model elements modeling the product by the at least one recipe step addressing an associated service declaration for each failure mode declaration using a recipe failure mode and a severity value.

3. The method according to claim 2 wherein the severity value is a quality attribute modeling an impact of an erroneous process output on an average quality of the product produced by the factory.

4. The method according to claim 1, wherein each equipment service comprises covered failure modes addressing equipment failure modes of equipment of the factory, wherein each covered failure mode includes a decreased occurrence value.

5. The method according to claim 1, wherein the occurrence value is a quality attribute of an equipment modeling a probability of an equipment failure mode.

6. The method according to claim 1, wherein the stored meta model comprises production model elements modeling process steps to be executed by the factory to produce the respective product in the production process fulfilling the recipe steps.

7. The method according to claim 1, wherein the abstract services provide a global library of all available production services across a plurality of different physical factories.

8. The method according to claim 1, wherein each service declaration comprises a service property declaration associated with a service constraint of an equipment service.

9. The method according to claim 8, wherein the service property declaration comprises parameters to be set for a recipe step.

10. The method according to claim 1, wherein available production processes usable to produce the respective product described in a recipe received from a terminal of a product owner are generated on the basis of the meta model stored in the data storage.

11. A system comprising:
    a network cloud infrastructure;
    a terminal of a product owner;
    a plurality of databases of a factory; and
    a central data storage,
    wherein the network cloud infrastructure is configured to automatically conduct a process failure mode and effect analysis for the factory adapted to produce a product in a production process using a meta model stored in the central data storage, the meta model comprising abstract factory model elements modeling an abstract factory including one or more service declarations each having constraints and parameters that are independent from any equipment and set for at least one recipe step for a recipe such that when the recipe is initiated the parameters need to be set, the one or more service declarations modeling abstract services across different factories,
    wherein each service declaration comprises failure mode declarations for different failure modes,
    wherein the stored meta model comprises factory related model elements addressing service declarations within equipment services, and
    wherein each equipment service comprises combinations of failure mode declarations of its associated service declaration and occurrence values,
    wherein the network cloud infrastructure is adapted to load and process meta models from the plurality of databases of the factory into the central data storage in response to a recipe received from the terminal of a product owner.

12. The system according to claim 11, wherein the network cloud infrastructure is adapted to process a received recipe for production of a product from the terminal of the product owner connected to the network cloud infrastructure to provide production processes usable to produce the respective product as described in the received recipe with a sufficient product quality fulfilling a severity requirement of the product owner indicated by a severity value.

* * * * *